Dec. 4, 1923.  W. C. RASTETTER  1,476,543
STEERING WHEEL
Filed Oct. 27, 1921
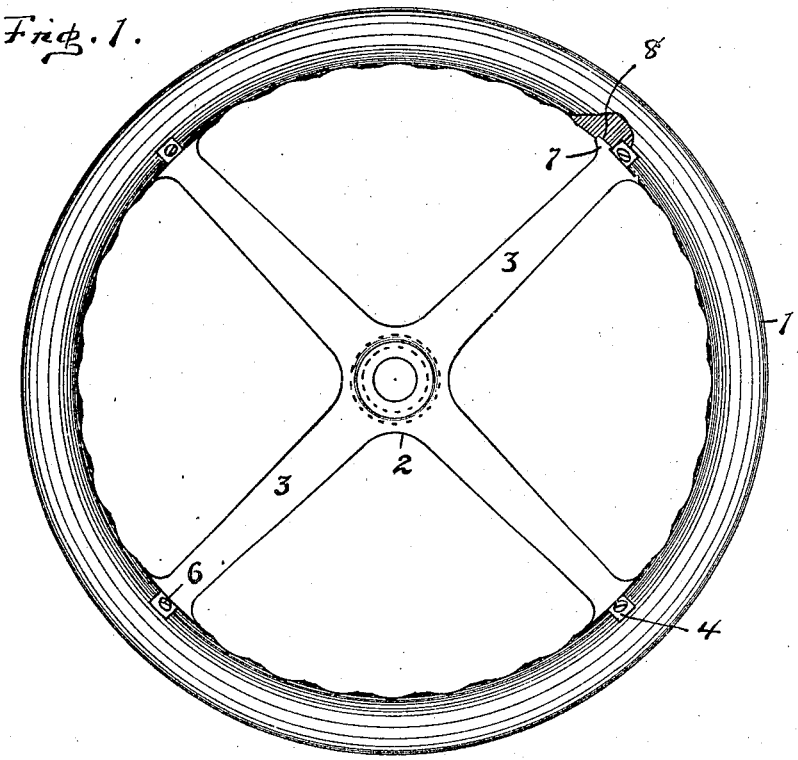
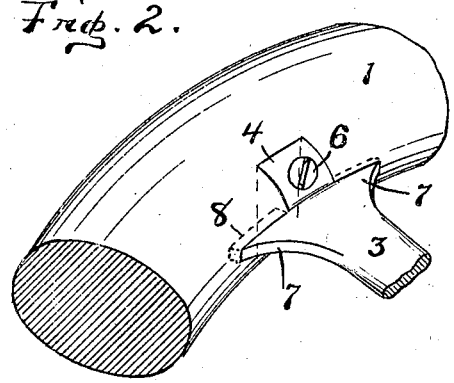
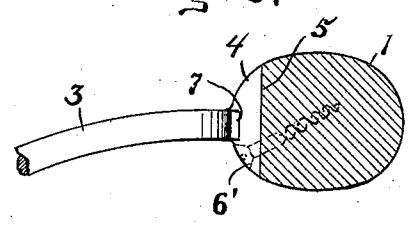
William C. Rastetter, Inventor
By W. G. Burns, Attorney Patented Dec. 4, 1923.

1,476,543

UNITED STATES PATENT OFFICE.

WILLIAM C. RASTETTER, OF FORT WAYNE, INDIANA.

STEERING WHEEL.

Application filed October 27, 1921. Serial No. 510,901.

*To all whom it may concern:*

Be it known that I, WILLIAM C. RASTETTER, a citizen of the United States of America, and resident of Fort Wayne, in the county of Allen and State of Indiana, have invented certain new and useful Improvements in Steering Wheels, of which the following is a specification.

This invention relates to improvements in steering wheels for automobiles, especially of that class in which the rim is composed of wood and the spider of metal, the invention pertaining particularly to the construction and manner of uniting the ends of the spider arms with the rim. The object of the invention is to so form the connections between the ends of the metallic spider arms and the wooden rim to insure permanence of the connections and to leave the rim free of obstructing projections at the points of its connections with the spider arms.

These objects are accomplished by the construction illustrated in the accompanying drawings in which:—

Fig. 1 is a plan view of a steering wheel embodying the invention, a portion of the rim being shown broken away;

Fig. 2 is a perspective view of a portion of the rim and end of one of the spider arms secured thereto; and Fig. 3 is a detail view showing a transverse section of the rim at the point of its connection with one of the spider arms and showing the securing screw applied in a different position from that shown in the other views.

The characters appearing in the description refer to parts shown in the drawings and designated thereon by corresponding characters.

The invention comprises a wooden rim 1 mounted in connection with a spider 2 having arms 3 which are connected respectively at their outer ends with the rim 1.

The outer end of each arm has an extending lug 4 that is made to fit and fill a corresponding recess 5 in the rim, which recess extends through the inner perimeter of the rim in a line parallel with the axial center of the wheel, those portions of the lug above and below the spider arms being shaped to conform with the surface of the rim adjacent thereto. Each of the lugs 4 is secured permanently in the corresponding recess in the rim by a screw 6. These screws may be applied through the upper portions of the lugs as illustrated in Figs. 1 and 2, or may be applied through the lower portion of the lug as the screw 6' shown in Fig. 3.

Each arm 3 also has a lateral enlargement 7 at each side of the lug 4 that is seated in a corresponding imprint 8 made in the rim so that the outermost terminal edges of the enlargements 7 are concealed in the rim.

By thus forming the ends of the spider arms but few and inexpensive operations are required in assembling the parts of the wheel, and the rim of the completed wheel is left without obstructing projections or indentations as the lugs completely fill the recesses made in the rim for their reception both above and below the arms proper while at the same time affording footings for the securing screws.

What I claim is:

A steering wheel having a wooden rim and metallic spider, the ends of the spider arms having respectively a lug that projects upwardly and downwardly therefrom and an extension at each side thereof, the rim having a recess for each of said lugs extending in a plane parallel with the axis of the wheel and corresponding imprints adjacent the respective sides of each recess for the reception of the corresponding extensions; and means engaging each of said lugs and extending into the rim to secure the same fixedly thereto.

In testimony whereof I affix my signature, in presence of two witnesses.

WILLIAM C. RASTETTER.

Witnesses:
 MATILDA METTLER,
 WALTER G. BURNS.